3,264,114
GELATIN-TYPE JELLY DESSERT MIX
Martin Glicksman, Valley Cottage, N.Y., and Ralph E. Schachat, Bloomfield, Conn., assignors to General Foods Corporation, White Plains, N.Y., a corporation of Delaware
No Drawing. Filed July 12, 1963, Ser. No. 294,735
1 Claim. (Cl. 99—130)

This invention relates to a new flavor composition and, more particularly, a flavor composition for use with a gelatin-type jelly dessert.

In the preparation of beverages, desserts, and other convenience foods containing flavors capable of being released on contact with water, a great deal of difficulty has been experienced in retaining the flavors in solid or dry form during storage so that they may be released on contact with water to produce the complete flavor impact while at the same time not affecting the color or appearance of the reconstituted product. The use of gums, such as gum arabic, to fix flavors has not completely solved this problem since the ideal flavor fixative should be completely edible, inexpensive, cold water soluble, capable of forming clear solutions (which solutions may be highly concentrated while still having a low viscosity) and capable of forming a stability enhancing coating or encapsulation of the unstable flavoring material. Many gums while being stable flavor fixatives provide deleterious side effects on reconstitution such as cloudy or turbid reconstitution products, off-tastes, poor solubility and an undesirable viscosity or texture. Particularly, is this a problem in the case of gelatin-type desserts and beverages wherein the conventional gum arabic flavor fixatives have a tendency to react with the gelatin to provide a cloudy product.

It would be desirable if an edible flavor fixative could be provided which is stable in the dry form while being non-reactive with normal food ingredients, cold water soluble, capable of forming clear solutions on rehydration, and capable of forming highly concentrated solutions without change in viscosity or pH.

It has now been discovered that a dry, relatively stable, flavoring composition can be produced comprising arabinogalactan and a normally liquid, volatile and unstable flavoring material, the arabinogalactan being present in at least 20% by weight of the total composition.

Preferably, the unstable flavoring material should be fixed in at least 50% by weight arabinogalactan, the arabinogalactan serving to coat or encapsulate the flavoring material to thereby stabilize the same.

Arabinogalactan (larch gum) is a water soluble gum obtained by the water extraction of the western larch tree (larix occidentalis) in which gum concentrations up to 25% may be found. The water extraction process gives a good quality arabinogalactan of 97% purity, this product can then be further purified by carbon treatment to give a final product of about 99% purity which is admirably suited for food use.

This gum is composed of arabinose and galactose in molar ratios of about 1:6, and has a molecular weight of 18,000–50,000. It is freely soluble in hot or cold water to give water solutions containing as high as 80% solids and a pH of about 4. Its high solubility allows the preparation of flavor compositions having a very high ratio of gum to flavor. Arabinogalactan can tolerate high temperatures, say 250°–300° F., without any significant change in viscosity. The gum is not adversely affected by acids, bases, and salts while being a good emulsifier.

In the spray drying and freeze drying of aqueous solutions or emulsions of unstable flavoring material and arabinogalactan, it has been found that the gum possesses highly desirable film-forming properties during the drying operation and causes an encapsulating coating of the gum to form around a nucleus of liquid flavoring material, the coating serving to enhance the stability or shelf-life of the particular flavor material being used while contributing no deleterious properties to the flavor composition. Preferably, the gum is mixed in an aqueous emulsion containing one (1) part by weight of arabinogalactan for one (1) part by weight of flavoring material, most preferably 3–6 parts by weight of arabinogalactan for each one (1) part by weight of flavoring material.

Representative of the many liquid flavoring materials which can be used in the practice of the invention are imitation raspberry, imitation cherry, imitation peach, imitation pineapple, imitation almond, imitation peppermint, imitation loganberry, imitation strawberry, oil of orange, oil of lemon, imitation rum, imitation wintergreen, imitation lemon, imitation vanilla, vanilla extract, oil of lime and the like.

In preparing the flavor fixative of this invention, the arabinogalactan and particular liquid flavoring material to be stabilized are both incorporated into a liquid solvent, such as water, to form a homogeneous mixture, preferably a solution. The liquid solvent is then evaporated at a low temperature to thereby obtain a solid product which is then comminuted into a powdered form. The amount of arabinogalactan to be used with different flavoring materials depends to some extent upon the volatility of the particular flavor material and upon whether it is in an oil-flavor or a water-soluble flavor. In general, satisfactory solid products may be obtained with as little as 20% by weight of arabinogalactan to as high as 80–95% by weight, but usually the arabinogalactan is between about 40–60% by weight. Due to the non-toxic and bland nature of the arabinogalactan, its permissible upper limit in the flavor compositions of this invention is limited solely by economic considerations while the lower limit of 20% by weight is the minimum amount of arabinogalactan necessary to provide protection of the flavoring material and provide a satisfactory solid product. Generally speaking, larger amounts of the arabinogalactan are required with the oily flavoring materials than with the water-soluble flavoring substances.

While the flavoring composition of this invention may be conveniently prepared by spray-drying an aqueous solution or emulsion of the arabinogalactan-flavor mixture, say at an inlet air temperature of 200°–400° F. and an outlet air temperature of 100°–200° F., it is obvious that such composition may also be dried by other methods such as freeze-drying and drum-drying. However, for most flavor materials it is preferred to spray-dry or freeze-dry the flavoring composition since it has been found that these methods form a highly stable encapsulating coating around a nucleus of flavor material. In most cases freeze-drying will give higher initial fixation than spray-drying and the addition of sugar fillers, such as corn syrup solids, lactose, and other polysaccharides, helps to increase the initial fixation and improve the stability of the final product.

This invention will now be described by reference to the following specific examples:

*Example I*

A solution was made of 80 grams of arabinogalactan (larch gum) in 80 ml. of water. About 20 grams of ethyl acetate was then slowly added to the solution with vigorous agitation to give a theoretical flavor yield of 20%. The mixture was blended well in an electric mixer for about 1–2 minutes to obtain a homogeneous emulsion. The emulsified mixture was then spray dried by atomizing the mixture by means of a centrifugal spinning disk into droplets having a maximum particle size distribution of 50–150 microns, the droplets being dried in a drying chamber having a volume of about 45 cubic feet at an inlet air temperature of 285° F. and an outlet air temperature of 140° F. The solution was fed by a gravity feed in a vertical tube onto the spinning disk which rotated at about 12,000 r.p.m. Feed rate of the solution was 250 lbs. per hour and the inlet drying air was introduced through a vertical tube directly under the spinning disk.

The dried product was powdered in appearance, non-hygroscopic and resistant to caking on contact with atmospheric air containing 50–70% relative humidity at a temperature of about 70° F. over a period of several days. The solid product upon reconstitution by addition of water readily yielded up its content of ethyl acetate which on analysis was shown to be 8.6 grams of ethyl acetate or about 43% retention of the flavor material.

The flavor composition was incorporated in the following gelatin-type jelly dessert formulation:

| Ingredient: | Grams |
|---|---|
| Sugar | 80.0 |
| Gelatin | 10.0 |
| Fumaric acid | 3.0 |
| Flavoring composition | 1.0 |
| Trisodium citrate | 0.8 |
| Color | 0.2 |

The formulation was packaged in the usual manner and retained its flavor after 3–4 months of storage at 70° F. and 50% relative humidity. Reconstitution with 450 ml. of boiling water gave a clear solution with no turbidity or cloud. The solution when gelled at refrigeration temperatures still retained its clear brilliance and the arabinogalactan was not found to mix with the setting properties of the gelatin. A control sample using gum arabic as the flavor fixative showed a cloudy, turbid solution on reconstitution and upon gelling.

Example II

The procedure of Example I was followed with the exception that 20 grams of acetaldehyde were used in place of the ethyl acetate. Analysis of the dried product showed a fixation of 10.2 grams of acetaldehyde or about 55% retention of the flavor component during spray-drying. This product was relatively stable under normal storage conditions.

Example III

The procedure of Example I was followed with the exception that 20 grams of imitation raspberry flavor was used in place of the ethyl acetate. Analysis of the dried product showed a fixation of 8 grams or about 40% retention of the flavor material, and the product was relatively stable under normal storage conditions comparing favorably to a gum arabic control sample.

The imitation raspberry flavor had the following formula:

| Ingredients: | Parts |
|---|---|
| Isobutyl acetate | 400 |
| Iosamyl acetate | 300 |
| Ethyl acetate | 200 |
| Ethyl formate | 30 |
| Benzyl benzoate | 20 |
| Bromelia | 15 |
| Vanillin | 10 |
| Linalool | 10 |
| Eugenol | 10 |
| Benzyl acetate | 3 |
| Geraniol | 1 |
| Ionone | 1 |

While this invention has been described by reference to specific examples, it is intended to be limited only by the scope of the appended claims.

What is claimed is:

A gelatin-type jelly dessert mix containing gelatin, sugar, fruit acid, color and flavor, said flavor comprising a normally liquid, volatile, and unstable flavoring material encapsulated in arabinogalactan.

References Cited by the Examiner

"Chemical Abstracts," vol. 28 (1934), 306–307.

Merory: "Food Flavorings," 1960, The Avi Publishing Co., Inc., Westport, Conn. pp. 274 to 277.

Whistler et al., "Industrial Gums," 1959, Academic Press, N.Y., pp. 308–309.

A. LOUIS MONACELL, *Primary Examiner.*

J. M. GOLIAN *Assistant Examiner.*